Patented Sept. 24, 1935

2,015,099

UNITED STATES PATENT OFFICE 2,015,099

PURIFICATION OF MALE SEXUAL HORMONE PREPARATIONS

Adolf Butenandt, Gottingen, Germany, assignor to Schering-Kahlbaum A. G., Berlin, Germany No Drawing. Application October 18, 1932, Serial No. 638,390. In Germany October 23, 1931

5 Claims. (Cl. 167—74)

My invention refers to the production of male sexual hormone preparations of great purity and one of its object is to provide means whereby pure preparations of this kind can be obtained in an easy manner.

As is well known to those skilled in the art, the methods hitherto employed in the treatment of crude preparations of this kind did not enable preparations containing male germinal gland hormone to be produced, whose degree of purity exceeded about 0.01 to 0.025 gram per capon unit, as defined in "Wiener Archiv für innere Medizin", vol. 21 (1931), p. 334.

I have now found that preparations of far greater purity can be obtained by employing methods which lead to the removal of constituents which extremely hinder further purification, for instance according to the disintegration methods usually adopted in the chemistry of the hormones (see Butenandt, "Untersuchungen über das weibliche Sexual-hormon (Follikel- oder Brunsthormon)", Berlin 1931, Weidmann'sche Buchhandlung).

In operating according to the present invention the raw preparations containing male sexual hormone are treated with a solution of hydrochloric acid in absolute alcohol. Some benzene is added and the solution thus obtained is precipitated with petrol ether, whereby the main quantity of the smeary constituents forming the greatest hindrance to further purification, are removed, the active matter being dissolved in the petrol ether. This solution can now be subjected to the methods of purification usually adopted in connection with hormones, as defined in my publication mentioned above.

In practicing my invention, I may for instance proceed as follows:—

Example 20 grams of a raw oily hormone preparation which was obtained from male urine according to the methods indicated by Funk, Harrow and Leywa, "Proc. Soc. Exp. Biol. and Med.", 26 (1929), 569, by acidifying male urine and extracting with chloroform and whose efficiency is about 0.01 gram per capon unit, are boiled 2 hours with 200 ccm. of an absolute methyl alcohol saturated in the cold with hydrochloric acid gas. To this solution is now added water and an extract is obtained by shaking repeatedly with 100 ccm. ether. The etheric solution is first washed with caustic alkali and thereafter with water and after drying is freed from the ether. 17 grams of a product are obtained, which is dissolved in about 10 ccm. hot benzene, to which are added slowly and under vigorous shaking 200 ccm. petroleum ether boiling at 70° C. There results a smeary precipitate from which the solution in petroleum ether is separated by decantation. The step of dissolving the precipitate in a small quantity of benzene and of precipitating with petrol ether is repeated several times, until the hitherto smeary precipitate has assumed a flocculent character. The several portions of petroleum ether solutions are now repeatedly and vigorously shaken with 100 ccm. of a mixture of 60 parts ethyl alcohol and 40 parts water. By evaporating the alcoholic solution in vacuo to dryness there are obtained about 0.5 gram of an oil having an efficiency of 0.3–0.4 milligrams per capon unit. No appreciable losses of hormone are encountered.

Instead of methyl or ethyl alcohol other alcohols, such as propyl alcohol and instead of petroleum ether, other water immiscible, saturated, aliphatic and cyclo-aliphatic hydrocarbons, such as ligroin, benzine and cyclo-hexane or others may be used. These hydrocarbons act to precipitate impurities from the hormone solutions.

Various changes may be made in the details disclosed in the foregoing specification without departing from the invention or sacrificing the advantages thereof.

I claim:—

1. In the process of purifying preparations containing the male germinal gland hormone, the steps comprising treating such preparations with a solution of hydrochloric acid in absolute alcohol removing the acid, adding benzene, adding to the benzene solution a water immiscible, saturated, low-boiling, liquid hydrocarbon of the aliphatic and cyclo-aliphatic series in excess, removing the precipitate and extracting the solution with a dilute organic solvent.

2. The method of purifying preparations containing the male germinal gland hormone comprising treating such preparations with a solution of hydrochloric acid in absolute alcohol removing the acid, adding benzene, adding to the benzene solution petrol ether in excess, removing the precipitate and extracting the solution with a dilute organic solvent.

3. The method of purifying preparations containing the male germinal gland hormone comprising treating such preparations with a solution of hydrochloric acid in absolute alcohol removing the acid, adding benzene, adding to the benzene solution a water immiscible, saturated, low-boiling, liquid hydrocarbon of the aliphatic and cyclo-aliphatic series in excess, removing the precipitate and extracting the solution with a dilute alcohol.

4. The method of purifying preparations containing the male germinal gland hormone comprising treating such preparations with a solution of hydrochloric acid in absolute alcohol, adding water, extracting with ether, washing and drying the ether solution, removing the ether, dissolving in benzene, adding to the benzene solution a water immiscible, saturated, low-boiling liquid hydrocarbon of the aliphatic and cyclo-aliphatic series in excess, removing the resulting precipitate and extracting the solution with a dilute organic solvent to recover the hormone.

5. In the process of purifying the male germinal gland hormone, the steps which comprise treating a preparation of said hormone with a solution of hydrochloric acid in absolute alcohol, dissolving the hormone in benzene, adding to said benzene solution a liquid hydrocarbon selected from a group consisting of petroleum ether, ligroin, benzine and cyclohexane, thereby producing a smeary precipitate, removing said precipitate and recovering said hormone from the remaining liquid.

ADOLF BUTENANDT.